(12) United States Patent
Kawatani et al.

(10) Patent No.: US 9,027,992 B2
(45) Date of Patent: May 12, 2015

(54) SEAT STRUCTURE FOR SADDLE-RIDE TYPE VEHICLE

(75) Inventors: Shinji Kawatani, Wako (JP); Mitsuo Nakagawa, Wako (JP); Yukinori Kurakawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 327 days.

(21) Appl. No.: 13/410,384

(22) Filed: Mar. 2, 2012

(65) Prior Publication Data

US 2012/0242118 A1 Sep. 27, 2012

(30) Foreign Application Priority Data

Mar. 25, 2011 (JP) .................................. 2011-068158

(51) Int. Cl.
| | |
|---|---|
| *B62J 1/00* | (2006.01) |
| *B62J 1/12* | (2006.01) |
| *B62J 1/18* | (2006.01) |
| *B62K 19/46* | (2006.01) |

(52) U.S. Cl.
CPC .... *B62J 1/12* (2013.01); *B62J 1/18* (2013.01); *B62K 19/46* (2013.01)

(58) Field of Classification Search
CPC ............. A47C 1/12; A47C 9/005; B62J 1/12; B62J 1/00

USPC ................ 297/195.11, 195.12, 214, 243, 202
See application file for complete search history.

(56) References Cited

U.S. PATENT DOCUMENTS

| | | | | |
|---|---|---|---|---|
| 4,413,700 A | * | 11/1983 | Shiratsuchi | ................... 180/219 |
| 4,691,963 A | * | 9/1987 | Mikuniya et al. | ........ 297/195.12 |
| 5,094,315 A | * | 3/1992 | Taki et al. | ..................... 180/219 |
| 7,131,691 B2 | * | 11/2006 | Ziegler | ...................... 297/215.12 |
| 8,002,346 B2 | * | 8/2011 | Wen | ............... 297/201 |
| 8,376,455 B2 | * | 2/2013 | Inoue et al. | .............. 297/215.15 |
| 2012/0126589 A1 | * | 5/2012 | Kawatani et al. | ........ 297/195.12 |

FOREIGN PATENT DOCUMENTS

| | | |
|---|---|---|
| JP | 11-139371 | 5/1999 |
| JP | 2001-341560 | 11/2001 |
| JP | 2002-211460 | 7/2002 |

* cited by examiner

*Primary Examiner* — David R Dunn
*Assistant Examiner* — Alexander Harrison
(74) *Attorney, Agent, or Firm* — Rankin, Hill & Clark LLP (57) ABSTRACT

A seat structure for a saddle-ride type vehicle, the seat structure including an outer frame portion in which a through-hole is formed at least at a seating position for the occupant to sit on; a seat skin that has elasticity is fixed to the outer frame portion while predetermined tensile force is applied thereto, and is disposed to cover a portion facing the through-hole; and a cushion member that is disposed between an upper surface of the outer frame portion and the seat skin, and bulges above an outer edge of the outer frame portion.

22 Claims, 7 Drawing Sheets

SEAT STRUCTURE FOR SADDLE-RIDE TYPE VEHICLE

BACKGROUND OF THE INVENTION

1. Field of the Invention

The present invention relates to a seat structure for a saddle-ride type vehicle.

2. Description of Related Art

For a saddle-ride type vehicle such as a motorcycle, a seat for an occupant to sit on has conventionally been proposed that includes a seat bottom plate, a cushion member such as urethane sponge disposed on an upper surface of the seat bottom plate, and a seat skin that covers an upper surface side of the cushion member (see Japanese Patent Application Publication No. 2002-211460, for example).

In the conventional technique, a cushioning property of the seat is provided by the deformation of the cushion member. Therefore, to secure sufficient cushioning property of the seat, a thickness of the cushion member is increased and thus, a seat height becomes large. As a result, reach to the ground during riding is lowered due to the large seat height in the saddle-ride type vehicle. Thus, a technique is called for that can make the seat height small while providing the desired cushioning property of the seat.

SUMMARY OF THE INVENTION

Thus, the present invention is directed toward providing a seat structure for a saddle-ride type vehicle that can make a seat height small while providing a desired cushioning property of a seat.

In accordance with the present invention, a seat structure for a saddle-ride type vehicle including a vehicle body and a seat for an occupant to sit on disposed above the vehicle body, the seat structure including: an outer frame portion in which a through-hole is formed at least at a seating position for the occupant to sit on; a seat skin that has elasticity is fixed to the outer frame portion while predetermined tensile force is applied thereto, and the seat skin is disposed to cover a portion facing the through-hole; and a cushion member disposed between an upper surface of the outer frame portion and the seat skin, and bulges above an outer edge of the outer frame portion.

According to this aspect of the invention, the seating positions of the seat are formed of a portion of the seat skin facing the through-hole. Thus, the cushioning property of the seating positions of the seat can be provided by the elastic deformation of the seat skins without disposing the cushion members at the seating positions. Thus, the seat height can be made low while providing the desired cushioning property of the seat. The cushion members bulge above the outer edge of the outer frame portion. Thus, the cushioning property can be provided near the outer edge of the outer frame portion in contact with the feet of the occupant. Thus, comfortableness of the occupant seated on the seat can be improved.

In further accordance with the present invention, the seat is an integrated seat including a front-side seating position and a rear-side seating position. Relative to the through-hole, the outer frame portion includes: a front-side through-hole formed in the front-side seating position; and a rear-side through-hole formed in the rear-side seating position. The outer frame portion also includes an opening formed between the front-side through-hole and the rear-side through-hole. A rear side of a side of the seat skin covering the front-side through-hole and a front side of a side of the seat skin covering the rear-side through-hole are fixed in the opening.

According to this aspect of the invention, the outer frame portion includes the front-side through-hole, the rear-side through-hole, the opening formed between the front-side through-hole and the rear-side through-hole. The rear side of the side of the seat skin covering the front-side through-hole and the front side of the side of the seat skin covering the rear-side through-hole are fixed inside the opening. Thus, the tensile force applied to the seat skin disposed on the front-side seating position and the tensile force applied to the seat skin disposed on the rear-side seating position can be set independently of each other. Accordingly, the cushioning property of the front-side seating position and the cushioning property of the rear-side seating position can be appropriately set.

When an occupant sits on one of the seating positions, influence of the load applied to the seat skin disposed on this one seating position on the seat skin disposed on the other one of the seating positions can be reduced. Thus, an influence of an occupant sitting on one of the seating positions on the cushioning property of the other of the seating positions can be reduced. Thus, comfortableness of the occupant sitting on the seat can be improved.

In further accordance with the present invention, the seat skin includes: an elastic seat member that has elasticity; and a skin seat member that is disposed on an upper surface of the elastic seat member and has waterproof property. The outer frame portion includes: a rear-side outer frame portion in which the rear-side through-hole is formed; and a front-side outer frame portion in which the front-side through-hole is formed. The front-side outer frame portion is disposed below the rear-side outer frame portion. The opening is provided between a front edge of the rear-side outer frame portion and a rear edge of the front-side outer frame portion. The skin seat member disposed on the front-side seating position, the skin seat member disposed on the rear-side seating position, and the elastic seat member disposed on the rear-side seating position are fixed near a front edge of the rear-side outer frame portion in the opening. The elastic seat member disposed on the front-side seating position is fixed near a rear edge of the front-side outer frame portion in the opening.

According to this aspect of the invention, the elastic seat member disposed on the front-side seating position and the elastic seat member disposed on the rear-side seating position can be respectively fixed to the front-side outer frame portion and the rear-side outer frame portion with tensile force applied thereto. The skin seat member disposed on the front-side seating position and the skin seat member disposed on the rear-side seating position can be fixed to the same position (near the front edge of the rear-side outer frame portion). Thus, at least the skin seat member disposed on the front-side seating position and the skin seat member disposed on the rear-side seating position can be integrally formed. Thus, the seat can be assembled more easily.

In further accordance with the present invention, the seat skin includes: an elastic seat member that has elasticity; and a skin seat member that is disposed on an upper surface of the elastic seat member and has waterproof property. The outer frame portion includes: a rear-side outer frame portion in which the rear-side through-hole is formed; and a front-side outer frame portion in which the front-side through-hole is formed. The opening is provided between a front edge of the rear-side outer frame portion and a rear edge of the front-side outer frame portion. A lower end portion of the front edge of the rear-side outer frame portion is positioned below an upper end portion of the rear edge of the front-side outer frame portion. The skin seat member and the elastic seat member disposed on the front-side seating position, as well as the skin seat member and the elastic seat member disposed on the rear-side seating position are fixed near a front edge of the rear-side outer frame portion in the opening.

According to this aspect of the invention, because the lower end portion of the front edge of the rear-side outer frame portion is positioned below the upper end portion of the rear edge of the front-side outer frame portion, even when the elastic seat member disposed on the front-side seating position is fixed near the front edge of the rear-side outer frame portion in the opening, the elastic seat member disposed on the front-side seating position can be fixed to the front-side outer frame portion with the tensile force applied to the front-side outer frame portion. Accordingly, the skin seat member and the elastic seat member disposed on the front-side seating position, as well as the skin seat member and the elastic seat member disposed on the rear-side seating position can be fixed at the same position (near the front edge of the rear-side outer frame portion). Therefore, the seat skin members can be integrally formed and the seat can be assembled more easily.

In further accordance with the present invention, the saddle-ride type vehicle includes a foot rest portion provided in front of and below the seat, the seat is openable and closable with a rotary shaft as a shaft fulcrum, the rotary shaft being provided at a front portion of the seat, and the cushion member is disposed on the upper surface of the outer frame portion at least at a position in the front portion of the seat.

Therefore, the occupant (driver) seated on the seat can stretch his or her legs toward the front from the seating position and rests the feet on the foot rest portion. Further, the cushion member is disposed on the upper surface of the outer frame portion at a portion positioned at a front portion of the seat. Thus, when the occupant seated on the seat places his or her feet on the foot rest portion, the cushioning property of the outer frame portion near the outer edge comes into contact with the leg of the occupant. Thus, the comfortableness of the occupant seated on the seat can be improved. The cushion member can be selectively disposed at a portion of the outer frame portion with which the feet of the occupant are in contact. Thus, the amount of cushion members used in the seat can be reduced and the weight of the seat can be made small.

The rotary shaft that allows the rotation of the seat is provided at a front portion of the seat. The seat is openable and closable with the rotary shaft serving as the shaft fulcrum. Thus, the side of the openable and closable seat on which a larger amount of the cushion members is disposed can be close to the rotary shaft as the shaft fulcrum. Accordingly, the position in the seat at which the amount of the cushion members disposed is relatively small and thus is light can be positioned far from the shaft fulcrum. Thus, the seat can be opened and closed lightly.

In further accordance with the present invention, the saddle-ride type vehicle further includes a luggage box disposed below the seat. Thus, in the saddle-ride type vehicle, the capacity of the luggage box can be made large without disposing the seat at a high position.

In further accordance with the present invention, the seat further includes a seat supporting portion that is disposed along an outer periphery of the outer frame portion on a lower surface side of the outer frame portion and transmits a load of the seat and a load applied to the seat to a side of the vehicle body. Thus, the load applied to the seat can be transmitted to the side of the vehicle-body frame through the seat supporting portion. Thus, the seat supporting portion can be formed of the peripheral portion of the outer frame portion at which the tensile force for the seat skin is produced. Thus, the portion of the outer frame portion at which the tensile force for the seat skin is produced can be supported on the side of the vehicle-body frame. Thus, the rigidity of the outer frame portion can be optimized, and the outer frame portion can be made lighter.

DETAILED DESCRIPTION OF THE PREFERRED EMBODIMENTS

Preferred embodiments of a seat structure of a saddle-ride type vehicle of the present invention will be described with reference to the drawings.

Figure 1:
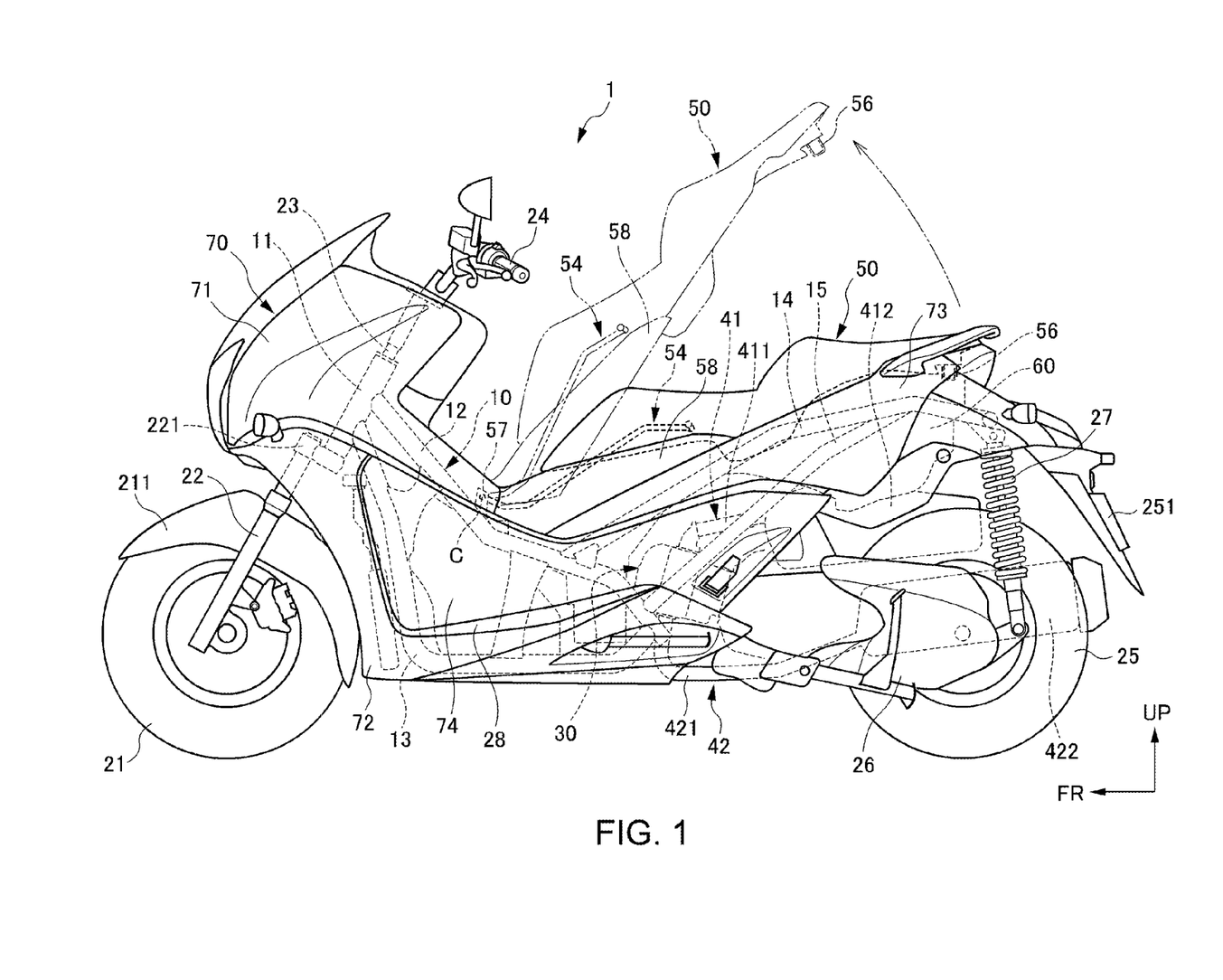
FIG. 1 is a left side view showing a motorcycle as a saddle-ride type vehicle including a seat structure of the present invention.

First, with reference to FIG. 1, an overall structure of a motorcycle 1 as a saddle-ride type vehicle including a seat structure according to a first embodiment of the present invention is described. FIG. 1 is a left side view showing the first embodiment of the motorcycle 1 including a seat structure of the present invention.

In the explanation given below, descriptions of front-rear, left-right, and upper-lower directions are based on directions viewed from an occupant (a driver) riding the motorcycle unless otherwise specified. In the figure, an arrow FR indicates a front direction of the vehicle while an arrow UP indicates an upper direction of the vehicle.

As shown in FIG. 1, the motorcycle 1 according to the first embodiment is the motorcycle 1 of a scooter type including a floor step 28 as a foot rest portion on which an occupant seated on a seat 50 rests his or her feet. The motorcycle 1 according to the first embodiment mainly includes: a vehicle-body frame 10 including a head pipe 11; a front wheel 21 disposed on the front side of the vehicle-body frame 10; a front fender 211 disposed above the front wheel 21; left and right front forks 22 that axially support the front wheel 21; a steering stem 23 that supports, via a bottom bridge 221, the front forks 22 to be rotatable with respect to the head pipe 11 in a left-right direction; a handle 24 connected to an upper end of the steering stem 23; a rear wheel 25 disposed on a rear side of the vehicle-body frame 10; a rear fender 251 disposed above the rear wheel 25; an engine 30 swingably connected to the vehicle-body frame 10; an intake device 41 and an exhaust device 42 connected to the engine 30; a power transmission system 26 attached to the engine 30 and axially supports the rear wheel 25; rear cushions 27; a seat 50 for an occupant to sit on; a luggage box 60 disposed below the seat 50; the floor step 28 as the foot rest portion on which the occupant seated on the seat 50 rests his or her feet; and a body cover 70 that covers the vehicle-body frame 10.

The vehicle-body frame 10 is formed by integrally connecting a plurality of types of steel materials by welding and the like. As shown in FIG. 1, the vehicle-body frame 10 includes: the head pipe 11; main frames 12; down frames 13; seat rails 14; rear frames 15; and a plurality of cross members (not shown).

The head pipe 11 is provided at a front end portion of the vehicle-body frame 10.

The main frames 12 are provided as a left and right pair. The main frames 12 have front end sides connected to the head pipe 11. In the side view, the main frames 12 extend downward toward the rear from the head pipe 11, bent at an intermediate portion to extend downward toward the rear while being relatively gently inclined, and is then bent again to extend downward toward the rear while being steeply inclined. Rear end sides of the pair of main frames 12 are connected to the down frames 13 and the rear frames 15.

The down frames 13 are disposed below the main frames 12 and provided as a left and a right pair. In the side view, the down frames 13 extend obliquely downward toward the rear from the head pipe 11 to a lower end side while being steeply inclined. Then, the down frames 13 extend toward the rear substantially horizontally from the lower end side, and then are bent at intermediate portions to extend slightly upward toward the rear. Rear end sides of the down frames 13 are connected to rear end sides of the main frames 12.

The seat rails 14 are provided as a pair of left and right pair. The seat rails 14 have front end sides connected to the gently inclined portions of the pair of main frames 12. In the side view, the seat rails 14 extend upward toward the rear while being relatively steeply inclined from the connected portions with the main frames 12, bent at intermediate portions to be gently inclined, and then are bent again to have rear end sides extend obliquely downward toward the rear. The rear end sides of the seat rails 14 are connected to the rear frames 15.

The rear frames 15 are provided as a left and right pair. The rear frames 15 each have one end connected to rear end portions of the pair of main frames 12. In the side view, the rear frames 15 extend upward toward the rear while being more steeply inclined than the seat rails 14. Rear end sides of the rear frames 15 are connected to the rear end sides of the seat rails 14.

The cross members (not shown) include a pipe member extending in the left-right direction, for example, and connect the frames provided as the left and right pair (main frames 12, down frames 13, seat frames 14, and the like).

As shown in FIG. 1, the engine 30 is a motor of the motorcycle 1 and is installed at a substantially center portion in the vehicle front-rear direction. The engine 30 is swingably connected to the vehicle-body frame 10 (seat rail) via a link mechanism (not shown).

The intake device 41 intakes air guided to the engine 30. The intake device 41 includes an intake pipe 411 connected to an upper portion of the engine 30 and an air cleaner 412 connected to the intake pipe 411. The intake pipe 411 is bent toward the rear from the upper portion of the engine 30 and extends toward the rear. The air cleaner 412 is disposed on the right side of the rear wheel 25.

The exhaust device 42 exhausts exhaust gas led out from the engine 30. The exhaust device 42 includes an exhaust pipe 421 connected to a lower portion of the engine 30 and a silencer 422 connected to a rear portion of the exhaust pipe 421. The exhaust pipe 421 bends toward the rear from the lower portion of engine 30 and extends toward the rear. The silencer 422 is disposed below the air cleaner 412 on the right side of the rear wheel 25.

The power transmission mechanism 26 transmits driving force from the engine 30 to the rear wheel 25. The power transmission mechanism 26 rotatably supports the rear wheel 25. The power transmission mechanism 26 is disposed on the left side in the vehicle width direction.

The rear cushions 27 are provided as a left and right pair. The rear cushion 27 on the left side has an upper end side connected to a rear end portion of the seat rail 14 and has a lower end side connected to a rear end portion of the power transmission mechanism 26. The rear cushion 27 on the right side (not shown) has an upper end side connected to a rear end portion of the seat rail 14 and a lower end side connected to a swing arm (not shown).

The seat 50 is disposed above the pair of seat rails 14. A structure of the seat 50 will be described in detailed later.

The luggage box 60 is disposed below the seat 50. More specifically, the luggage box 60 is disposed in a space above the engine 30 and below the seat 50 and is fixed to the vehicle-body frame 10. The luggage box 60 has a box shape elongated in the vehicle front-rear direction and has an upper surface opened. The seat 50 is disposed to cover the opened upper surface of the luggage box 60.

The floor step 28 is disposed in front of and below the seat 50.

The body cover 70 mainly includes: a front cover 71 covering a front side of the handle 24 and an upper side of the front wheel 21; side covers 72 that cover side portions of the front fork 22, side portions of the floor step 28, and the like; a rear cover 73 that covers a rear portion of the vehicle-body frame 10 and an upper side of the rear wheel 25; a center cover 74 the covers the vehicle frame 10 below the seat 50.

Figure 2:
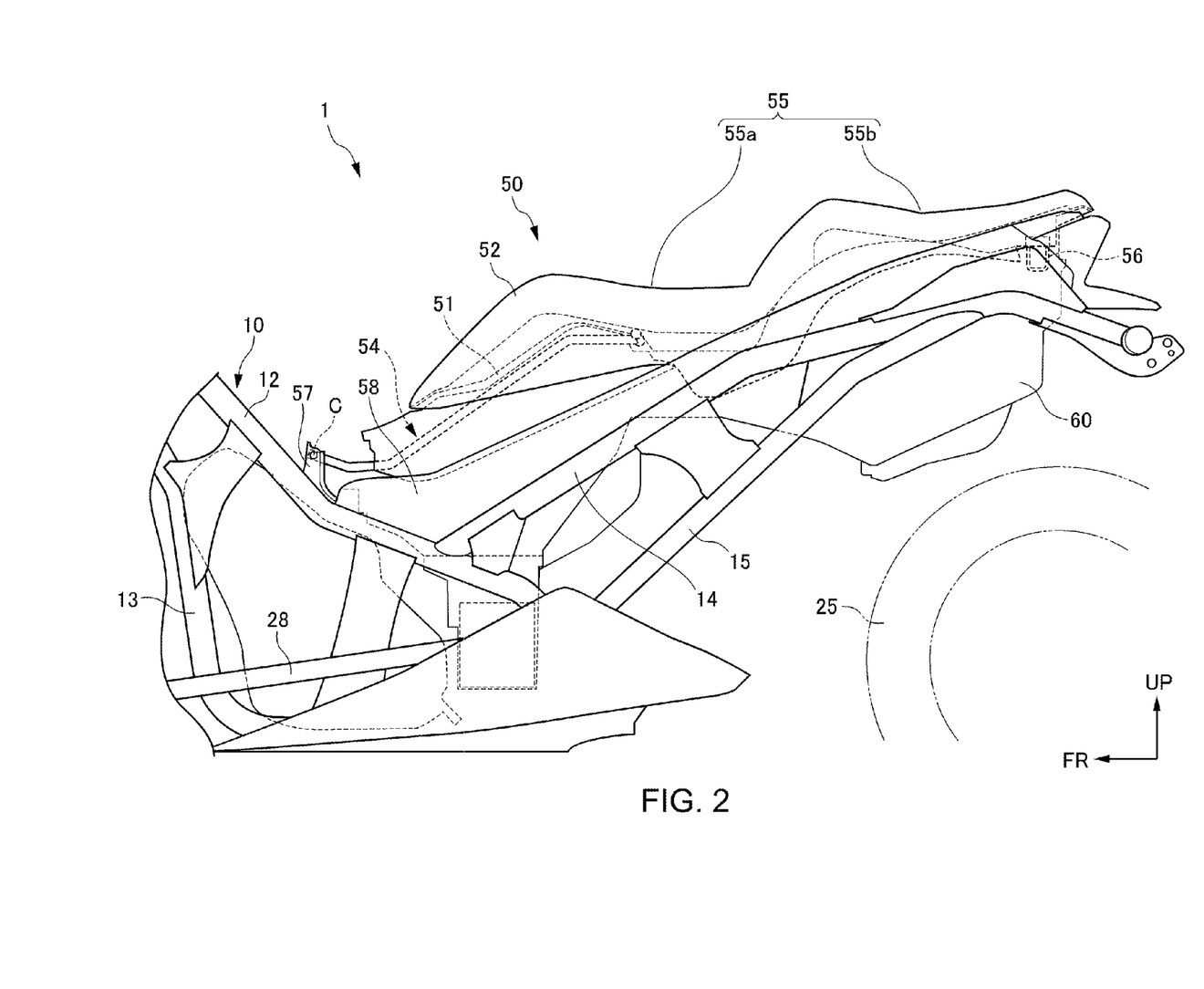
FIG. 2 is a left side view of showing a seat structure according to a first embodiment of the present invention.
Figure 3:
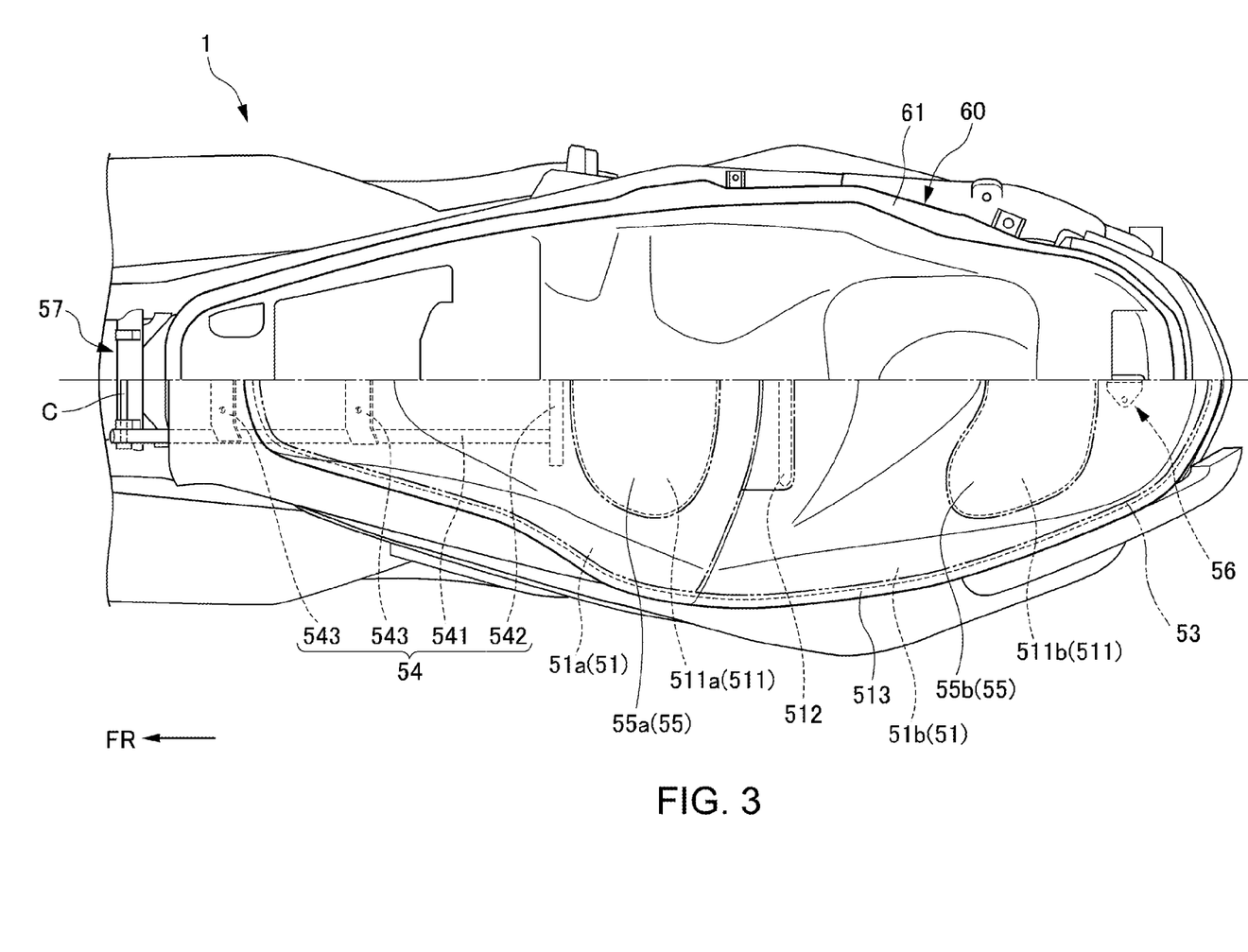
FIG. 3 is a plan view showing the seat structure according to the first embodiment of the present invention.
Figure 4:
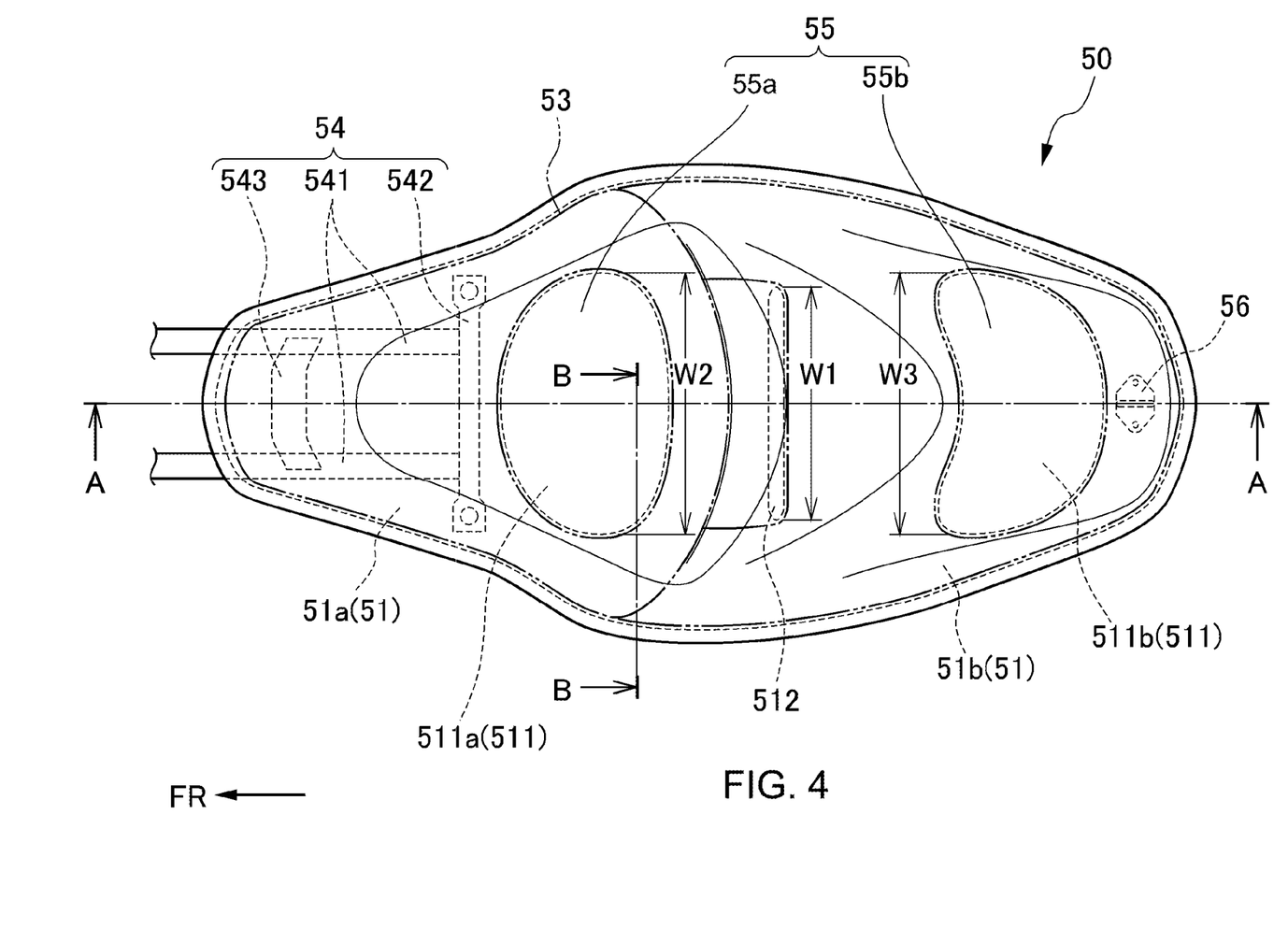
FIG. 4 is a plan view showing a seat in the seat structure according to the first embodiment.
Figure 5:
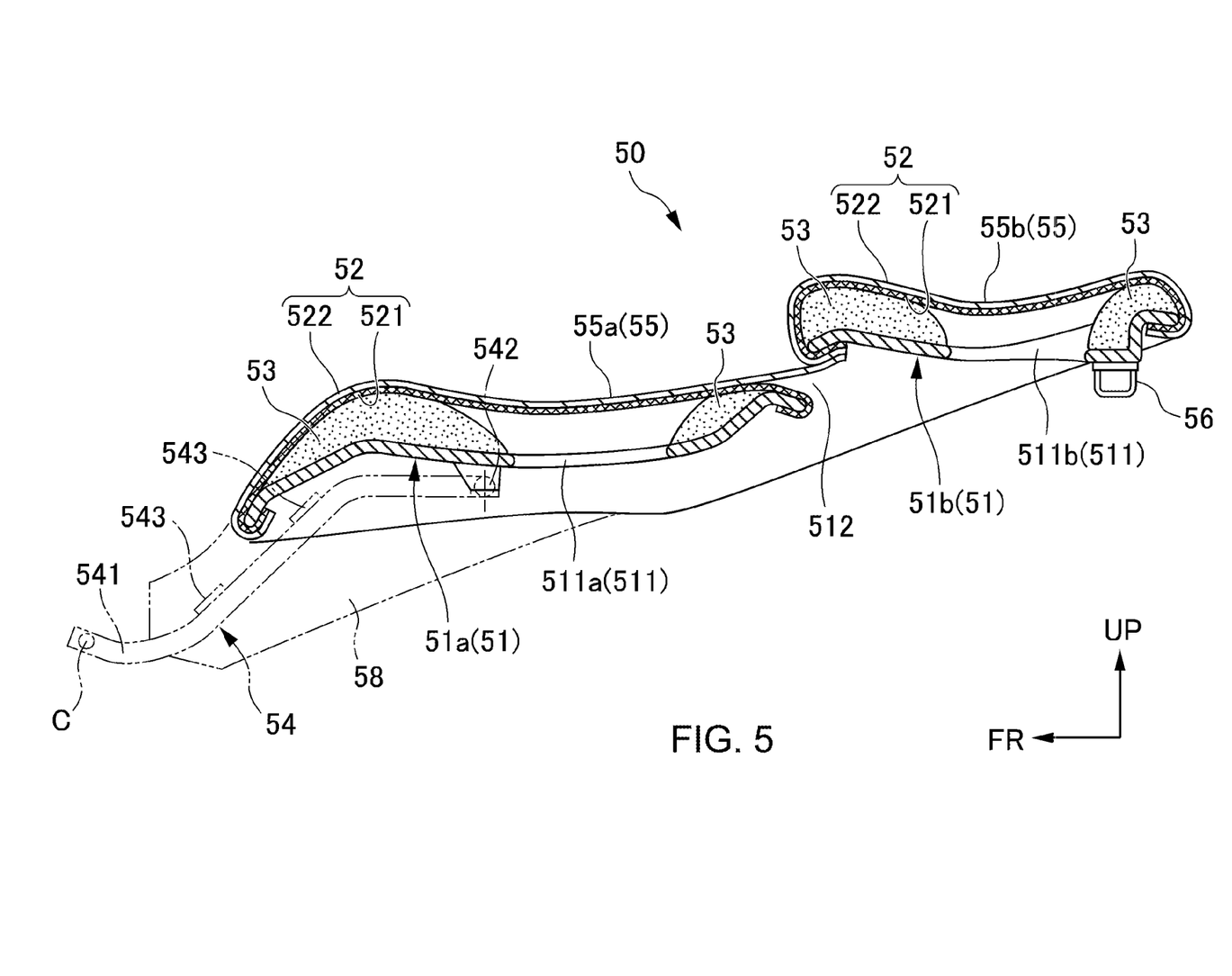
FIG. 5 is a cross-sectional view taken along a line A-A in FIG. 4.
Figure 6:
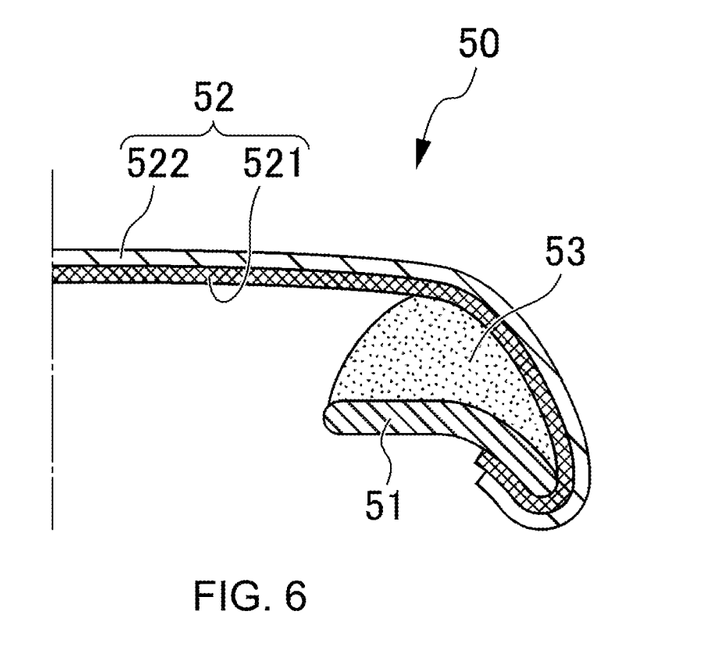
FIG. 6 is a cross-sectional view taken along a line B-B in FIG. 4 (only a left half portion is shown).

Next, the structure of the seat 50 of the first embodiment will be described. FIG. 2 is an enlarged left side view of a seat structure portion in FIG. 1. FIG. 3 is an enlarged plan view of the seat structure portion of the motorcycle 1 with a part of the seat 50 omitted. FIG. 4 is a schematic plan view of the seat structure according to the first embodiment. FIG. 5 is a cross-sectional view taken along a line A-A in FIG. 4. FIG. 6 is a cross-sectional view taken along a line B-B in FIG. 4.

As shown in FIG. 2 and FIG. 3, the seat 50 according to the first embodiment includes, as seating positions 55a a front-side seating position 55a for a driver to sit on and a rear-side seating position 55b for a fellow passenger to sit on. The seat 50 is an integrated seat in which the front-side seating position 55a and the rear-side seating position 55b are integrally formed.

As shown in FIG. 2 to FIG. 5, the seat 50 according to the first embodiment includes: an outer frame portion 51; seat skins 52 disposed on an upper surface side of the outer frame portion 51; cushion members 53 disposed between the outer frame portion 51 and the seat skins 52; a seat stay 54 and a seat lock plate 56 attached on a lower surface side of the outer frame portion 51; a hinge member 57 that connects the seat stay 54 and the vehicle-body frame 10; and a cover member 58 that covers the lower surface side of the outer frame portion 51.

The outer frame portion 51 is integrally formed of a hard material such as a hard resin and forms a frame of the seat 50. The outer frame portion 51 includes: a front-side outer frame portion 51a; a rear-side outer frame portion 51b; a front-side through-hole 511a and a rear-side through-hole 511b as through-holes 511; an opening 512 formed between the front-side through-hole 511a and the rear-side through-hole 511b; and a seat supporting portion 513.

As shown in FIG. 3 and FIG. 4, the front-side outer frame portion 51a forms a front side of the outer frame portion 51. The front-side outer frame portion 51a has a shape curved to protrude toward the forward in a plan view. As shown in FIG. 5, a shape of the front-side outer frame portion 51a in a side view is as follows. Specifically, a front portion obliquely extends downward toward the front while being gently inclined, a center portion disposed substantially horizontally, and a rear portion obliquely extends upward toward the rear while being inclined gently. A rear end portion of the front-side outer frame portion 51a is bent to obliquely extend downward toward the rear.

The rear-side outer frame portion 51b forms a rear side of the outer frame portion 51. The rear-side outer frame portion 51b has a shape curved to protrude toward the rear in the plan view. As shown in FIG. 5, a shape of the rear-side outer frame portion 51b in a side view is as follows. Specifically, a front portion obliquely extends downward toward the front while being gently inclined, a center portion disposed substantially horizontally, and a rear portion bent to vertically stand and then bent to extend horizontally.

The above-described rear-side outer frame portion 51b is disposed above the front-side outer frame portion 51a.

As shown in FIG. 3 and FIG. 4, the front-side through-hole 511a is formed in the front-side outer frame portion 51a on the rear side in the vehicle front-rear direction. The front-side through-hole 511a is formed at a position corresponding to the front-side seating position 55a. The front-side through-hole 511a has a substantially ellipsoidal shape elongated in the vehicle width direction in the plan view.

As shown in FIG. 3 and FIG. 4, the rear-side through-hole 511b is formed in the rear-side outer frame portion 51b at a substantially center portion in the vehicle front-rear direction. The rear-side through-hole 511b is formed at a position corresponding to the rear-side seating position 55b. The rear-side through-hole 511b has the following shape in a side view. Specifically, a front edge portion is recessed toward the rear and a rear edge portion bulges toward the rear.

As shown in FIG. 5, the opening 512 is formed between a front edge of the rear-side outer frame portion 51b and a rear edge of the front-side outer frame portion 51a. The opening 512 is formed at a step portion formed between the rear-side outer frame portion 51b and the front-side outer frame portion 51a disposed below the rear-side outer frame portion 51b and is opened toward the front.

In the first embodiment, as shown in FIG. 4, a length W1 of the opening 512 in the vehicle width direction is substantially the same or slightly shorter that a length W2 of the front-side through-hole 511a in the vehicle width direction and a length W3 of the rear-side through-hole 511b in the vehicle width direction. The length W2 of the front-side through-hole 511a in the vehicle width direction and the length W3 of the rear-side through-hole 511b in the vehicle width direction are substantially the same.

As shown in FIG. 3 and FIG. 4, the seat supporting portion 513 is provided along the outer periphery of the lower surface side of the outer frame portion 51. More specifically, the seat supporting portion 513 is formed of an outer peripheral portion of the lower surface side of the outer frame portion 51. The seat supporting portion 513 is provided at a position to be in contact with an upper end surface 61 (see FIG. 3) of a peripheral wall of the luggage box 60. The seat supporting portion 513 transmits the load of the seat 50 and the load (weight of the occupant) applied on the seat 50 to a side of the vehicle-body frame 10 through the luggage box 60.

The seat skins 52 have elasticity and cover an entire area of an upper surface side of the outer frame portion 51. As shown in FIG. 5 and FIG. 6, the seat skins 52 each include an elastic seat member 521 disposed on the outer frame portion 51 side and a skin seat member 522 disposed on an upper surface of the elastic seat member 521.

The elastic seat member 521 has predetermined elasticity. As the elastic seat member 521, a mesh fabric having flexibility that is formed by weaving a polyester fabric into a mesh shape can be used.

The skin seat member 522 has waterproof property and antiweatherability. As the skin seat member 522, a seat member made of a synthetic resin material such as vinyl chloride can be used.

As shown in FIG. 5 and FIG. 6, the cushion members 53 are disposed on the upper surface of the outer frame portion 51, covered by the seat skin members 52, and bulge above the outer edge of the outer frame portion 51.

The cushion member 53 is disposed at least at a position in a front portion of the upper surface of the outer frame portion 51. In the first embodiment, as shown in FIG. 3 to FIG. 6, the cushion members 53 are disposed on the outer frame portion 51 in regions excluding positions facing the through-holes 511 and the opening 512 in the outer frame portion 51. A large portion of the cushion members 53 is disposed at a portion in front of the front-side through-hole 511a in the front-side outer frame portion 51a. The amount of cushion members 53 disposed in the rear-side outer frame portion 51b is smaller than the amount of the cushion members 53 disposed in the front-side outer frame 51a.

As the cushion member 53, a urethane foam material having fine cushioning property can be used.

As shown in FIG. 5, the seat stay 54 is attached to the outer frame portion 51 at a front portion of the lower surface. As shown FIG. 3 to FIG. 5, the seat stay 54 includes a pair of first pipe members 541 disposed along the vehicle front-rear direction; a second pipe member 542 that connects the pair of first pipe members 541 in the vehicle width direction; and a plurality of connecting plates 543.

The first pipe members 541 are disposed with a predetermined interval in the vehicle width direction provided therebetween. The second pipe member 542 is disposed at rear end portions of the pair of first pipe members 541 and connects the first pipe members 541. The connecting plates 543 connect the pair of first pipe members 541 at positions on the front side of the second pipe member 542.

A rear end portion of the above-described seat stay 54 is connected to the front-side outer frame portion 51a at a position in front of the front-side through-hole 511a. As shown in FIG. 1 and FIG. 2, the front end portion of the seat stay 54 is connected to the vehicle-body frame 10 via the hinge member 57. Thus, the seat stay 54 (seat 50) is rotatably connected to the vehicle-body frame 10 (main frame 12) with a rotary shaft C of the hinge portion 57 serving as a shaft fulcrum (see FIG. 1).

As shown in FIG. 4 and FIG. 5, the seat lock plate 56 is attached to the lower surface of the rear outer frame portion 51b at a rear portion. The seat lock plate 56 is locked to the luggage box 60 in a closing state of the seat 50 to maintain the closing state of the seat 50.

As shown in FIG. 1 and FIG. 2, the hinge portion 57 is disposed on a front side of the seat 50 and is connected to the main frames 12 by welding and the like. As described above, the front end portions of the pair of first pipe members 541 of the seat stay 54 is rotatably connected to the hinge portion 57 with the rotary shaft C extending in the vehicle width direction serving as the shaft fulcrum.

As shown in FIG. 5, the cover member 58 is mainly disposed below the lower surface side of the outer frame portion 51 and the seat stay 54 to cover the lower sides of the outer frame portion 51 and the seat stay 54. As shown in FIG. 2, the cover member 58 covers an upper surface and side surfaces of a portion of the front portion of the seat stay 54 extending more to the front than the outer frame portion 51. The cover member 58 is made of a hard synthetic resin.

The above-described seat 50 is formed by disposing the cushion members 53 on the upper surface of the outer frame portion 51 at predetermined regions of portions at which the through-holes 511 are not formed and then covering the upper surface sides of the cushion members 53 with the seat skins 52.

Here, the seat skins 52 each have peripheral portions tucked into the lower surface side at peripheral portions of the outer frame portion 51 to be fixed thereat with metal clips and the like (not shown) while the seat skins 52 are pulled so that predetermined tensile force in the vehicle front-rear direction is produced.

In the first embodiment, as shown in FIG. 5, a rear side of a side of the seat skin 52 covering the front-side through-hole 551a and a front side of the seat skin 52 covering the rear-side through-hole 511b are fixed inside the opening 512. More specifically, a rear end portion of the skin seat member 522 disposed on the front-side seating position 55a, a front end portion of the skin seat member 522 disposed on the rear-side seating position 55b, and a front end portion of the elastic seat member 521 disposed on the rear-side seating position 55b are fixed near a front edge of the lower surface of the rear-side outer frame portion 51b in the opening 512 while being pulled so that tensile force in the front-rear direction is produced. A rear end portion of the elastic seat member 521 disposed on the front-side seating position 55a is fixed near a front edge of the lower surface of the front-side outer frame portion 51a in the opening 512 while being pulled so that tensile force in the front-rear direction is produced.

The seat structure according to the first embodiment provides the following advantageous effects.

The seat structure includes the outer frame portion 51 provided with the through-holes 511, the seat skins 52 that is fixed to the outer frame portion 51 with predetermined tensile force applied thereto and cover the through-holes 511, and the cushion members 53 disposed between the outer frame portion 51 and the seat skins 52. Thus, each of the seating positions 55 of the seat 50 includes a portion of the seat skin 52 facing the through-holes 511. Thus, the cushioning property of the seating positions 55 of the seat 50 can be secured with the elastic deformation of the seat skins 52 disposed at portions facing the through-holes 511 without disposing the cushion member 53 at the seating positions 55. Thus, the seat height can be made low while securing the cushioning property of the seat 50.

The cushion members 53 bulge above the outer edge of the outer frame portion 51. Thus, the cushioning property can be secured at portions near the outer edge of the outer frame portion 51 to be in contact with the leg of the occupant. Thus, comfortableness of the occupant seated on the seat 50 can be improved.

The through-holes 511 are formed in the outer frame portion 51 and the cushion members 53 are disposed only between the outer frame portion 51 and the seat skin 52. Thus, the seat 50 and the motorcycle 1 can be made lighter.

The outer frame portion 51 includes the front-side through-hole 511a, the rear-side through-hole 511b, the opening 512 disposed between the front-side through-hole 511a and the rear-side through-hole 511b. The rear side of the side of the seat skin 52 covering the front-side through-hole 511a and the front side of the side of the seat skin 52 covering the rear-side through-hole 511b are fixed inside the opening 512. Thus, the tensile force applied to the seat skin 52 disposed on the front-side seating position 55a and the tensile force applied to the seat skin 52 disposed on the rear-side seating position 55b can be set independently from each other. Accordingly, the cushioning property of the front-side seating position 55a and the cushioning property of the rear-side seating position 55b can be appropriately set.

When the occupant sits on one of the seating positions 55, an influence of the load applied to the seat skin 52 disposed on this one seating position 55 on the seat skin 52 disposed on the other one of the seating positions 55 can be reduced. Thus, an influence of an occupant sitting on one of the seating positions 55 on the cushioning property of the other of the seating positions 55 can be reduced. Thus, the comfortableness of the occupant sitting on the seat 50 can be improved.

The seat skins 52 each include the elastic seat member 521 and the skin seat member 522. Moreover, the rear end portion of the skin seat member 522 disposed on the front-side seating position 55a, the front end portion of the skin seat member 522 disposed on the rear-side seating position 55b, and the front end portion of the elastic seat member 521 disposed on the rear-side seating position 55b are fixed near a front edge of the rear-side outer frame portion 55b in the opening 512. Meanwhile, the rear end portion of the elastic seat member 521 disposed on the front-side seating position 55a is fixed near the rear edge of the front-side outer frame portion 51a inside the opening 512. Thus, the elastic seat member 521 disposed on the front-side seating position 55a and the elastic seat member 521 disposed on the rear-side seating position 55b can be respectively fixed to the front-side outer frame portion 51a and the rear-side outer frame portion 51b with tensile force applied thereto. The skin seat member 522 disposed on the front-side seating position 55a and the skin seat member 522 disposed on the rear-side seating position 55b can be fixed to the same position (near the front edge of the rear-side outer frame portion 51b). Thus, at least the skin seat member 522 disposed on the front-side seating position 55a and the skin seat member 522 disposed on the rear-side seating position 55b can be integrally formed. Thus, the seat 50 can be assembled more easily.

The width W1 of the opening 512 in the vehicle width direction is substantially the same or slightly smaller than the width W2 of the front-side through-hole 511a in the vehicle width direction and the width W3 of the rear-side through-hole 511b in the vehicle width direction. Thus, the entire length of portions of the elastic seat members 521 covering the front-side through-hole 511a and the rear-side through-hole 511b can be fixed in the opening 512 with the tensile force produced. Thus, the cushion property of the front-side through-hole 511a and the rear-side through-hole 511b can be more improved.

In the motorcycle (saddle-ride type vehicle) 1 of a scooter type in which the floor step 28 is provided in front of and below the seat 50, the occupant (driver) seated on the seat 50 stretch his or her legs toward the front from the seating position 55 and rests his or her feet on the floor step 28. Thus, the cushion member 53 is disposed on the upper surface of the outer frame portion 51 at a portion positioned at a front portion of the seat 50. Thus, when the occupant seated on the seat 50 places his or her feet on the floor step 28, the cushioning property can be secured at a portion near the outer edge (front edge) of the outer frame portion 51 (front-side outer frame portion 51a) with which the leg of the occupant are in contact. Thus, the comfortableness of the occupant seated on the seat 50 can be improved. The cushion member 53 can be selectively disposed at a portion of the outer frame portion 51 with which the feet of the occupant are in contact. Thus, the amount of cushion members 53 used in the seat 50 can be reduced and the seat 50 can be made lighter.

The rotary shaft C that allows the rotation of the seat 50 is provided in front of the seat 50. The seat 50 is openable and closable with the rotary shaft C serving as the shaft fulcrum. Thus, the portion of the openable and closable seat 50 at which larger amount of cushion members 53 is disposed can be positioned close to the rotary shaft C as the shaft fulcrum. Accordingly, the portion in the seat 50 at which the amount of cushion members 53 disposed is relatively small can be positioned far from the axis fulcrum and can be made light. Thus, the seat 50 can be opened and closed lightly.

In the seat structure of the present invention, no cushion member 53 is disposed in the seating positions 55 and thus the thickness of the seat 50 can be made small. The luggage box 60 is disposed below the seat 50. Thus, in the motorcycle 1, the capacity of the luggage box 60 can be made large without disposing the seat 50 at a high position.

The seat supporting portion 513 is provided along the outer periphery of the bottom surface of the outer frame portion 51 to which the seat skin 52 is fixed. Thus, the load applied to the seat 50 can be transmitted to the side of the vehicle-body frame 10 through the seat supporting portion 513 and the luggage box 60 with which the seat supporting portion 513 is in contact. Thus, the seat supporting portion 513 can be formed of the peripheral portion of the outer frame portion 51 at which the tensile force for the seat skin 52 is produced. Thus, the portion of the outer frame portion 51 at which the tensile force for the seat skin 52 is produced can be supported by the vehicle-body frame 10 while being in contact with the luggage box 60. Thus, the rigidity of the outer frame portion 51 can be optimized, and the outer frame portion 51 can be made lighter.

Figure 7:
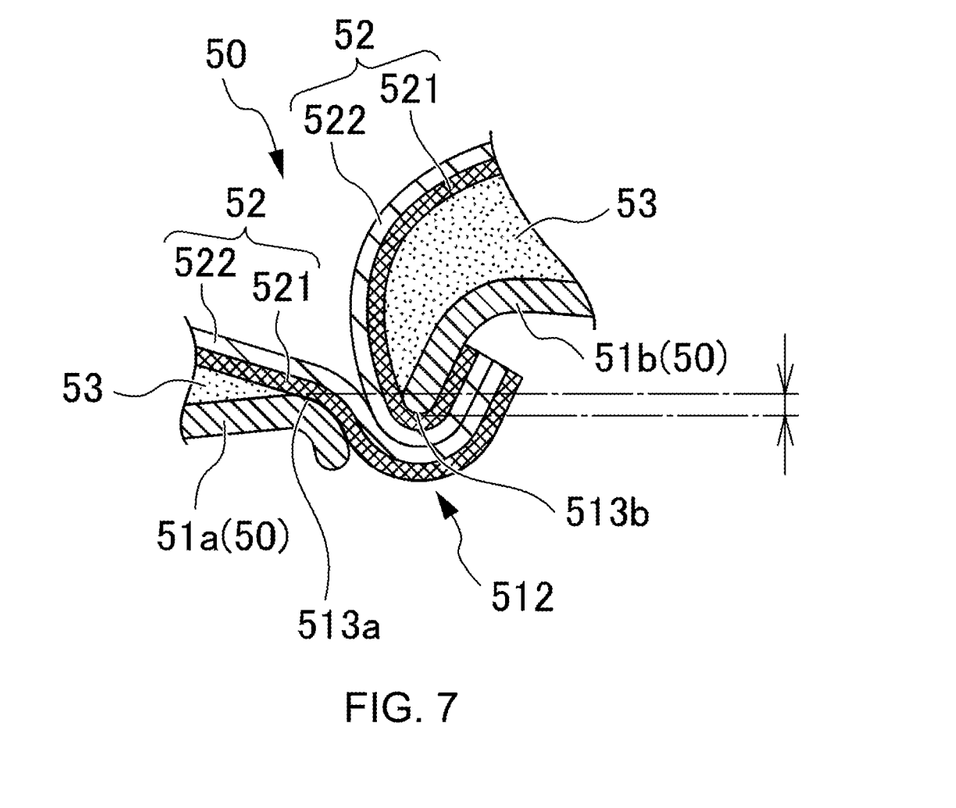
FIG. 7 is a cross-sectional view showing a main part of a seat structure according to a second embodiment of the present invention.

Next, a second embodiment of the seat structure of the present invention will be described by referring to FIG. 7. FIG. 7 is a cross-sectional view of a main portion of the seat structure according to the second embodiment and is a diagram corresponding to the cross-sectional view taken along a line A-A in FIG. 4.

In the explanation of the second embodiment, the same components are given the same reference numerals and the description thereof is omitted or simplified.

The seat structure of the second embodiment is mainly different from that of the first embodiment in the structure of the outer frame portion 51 and the fixed portion of the seat skin 52 in the opening 512.

As shown in FIG. 7, in the outer frame portion 51 in the second embodiment, a lower end portion 513b of the front edge of the rear-side outer frame portion 51b is positioned below an upper end portion 513a of the rear edge of the front-side outer frame portion 51a. The skin seat member 522 and the elastic seat member 521 disposed on the front-side seating position 55a, as well as the skin seat member 522 and the elastic seat member 521 disposed on the rear-side seating position 55b are all fixed near the front edge on the lower surface of the rear-side outer frame portion 51b in the opening 512.

The seat structure according to the second embodiment provides the following advantageous effect in addition to the advantageous effects similar to those of the first embodiment.

The opening 512 is formed between the front edge of the rear-side outer frame portion 51b and the rear edge of the front-side outer frame portion 51a. The lower end portion 513b of the front edge of the rear-side outer frame portion 51b is positioned below the upper end portion 513a of the rear edge of the front-side outer frame portion 51a. The seat skins 52 each include the elastic seat member 521 and the skin seat member 522. The skin seat member 522 and the elastic seat member 521 disposed on the front-side seating position 55a, as well as the skin seat member 522 and the elastic seat member 521 disposed on the rear-side seating position 55b are fixed near the front edge of the rear-side outer frame portion 51b in the opening 512. Thus, because the lower end portion 513b of the front edge of the rear-side outer frame portion 51b is positioned below the upper end portion 513a of the rear edge of the front-side outer frame portion 51a, even when the elastic seat member 521 disposed on the front-side seating position 55a is fixed near the front edge of the rear-side outer frame portion 51b in the opening 512, the elastic seat member 521 disposed on the front-side seating position 55a can be fixed to the front-side outer frame portion 51a while the tensile force is applied thereto. Accordingly, the skin seat member 522 and the elastic seat member 521 disposed on the front-side seating position 55a, as well as the skin seat member 522 and the elastic seat member 521 disposed on the rear-side seating position 55b can be fixed at the same position (near the front edge of the rear-side outer frame portion 51b). Therefore, the seat skins 52 can be integrally formed and the seat 50 can be more easily assembled.

Although the preferred embodiments of the present invention have been described, the present invention is not limited to the above-described embodiments and can be embodied in various forms.

For example, in the first embodiment, the length W1 of the opening 512 in the vehicle width direction is substantially the same or slightly smaller than the length W2 of the front-side through-hole 511a in the vehicle width direction and the length W3 the rear-side through-hole 511b in the vehicle width direction. The present invention is not limited to this. The length of the opening 512 in the vehicle width direction may be larger than the lengths of the front-side through-hole and the rear-side through-hole in the vehicle width direction. Thus, the length W1 of the opening 512 in the vehicle width direction should be long enough so that the tensile force in the front-rear direction applied to the seat skin 52 can be sufficiently received at the outer frame portion 51.

What is claimed is:

1. A seat structure for a saddle-ride type vehicle including a vehicle body and a seat for an occupant to sit on disposed above the vehicle body, the seat structure comprising:
   an outer frame portion in which a through-hole is formed at least at a seating position for the occupant to sit on, the through-hole is located on an upper surface of the outer frame portion and spaced from an outer edge of the outer frame portion and;
   a seat skin that has elasticity, is fixed to the outer frame portion while predetermined tensile force is applied thereto, and is disposed to cover a portion facing the through-hole; and
   a cushion member that is disposed between the upper surface of the outer frame portion and the seat skin, and bulges above the outer edge of the outer frame portion,
   wherein
   the seat is an integrated seat including a front-side seating position and a rear-side seating position,
   the upper surface of the outer frame portion further includes an opening spaced from the outer edge and formed between the front-side seating position and the rear-side seating position, and
   a rear side of a side of the seat skin covering the front-side seating position and a front side of a side of the seat skin covering the rear-side seating position are directly fixed to the outer frame portion in the opening.

2. The seat structure for the saddle-ride type vehicle according to claim 1, wherein
as the through-hole, the outer frame portion includes:
a front-side through-hole formed in the front-side seating position; and
a rear-side through-hole formed in the rear-side seating position,
the opening formed between the front-side through-hole and the rear-side through-hole, and
the rear side of the side of the seat skin covering the front-side seating position covers the front-side through-hole and the front side of the side of the seat skin covering the rear-side seating position covers the rear-side through-hole.

3. The seat structure for the saddle-ride type vehicle according to claim 2, wherein
the seat skin includes:
an elastic seat member that has elasticity; and
a skin seat member that is disposed on an upper surface of the elastic seat member and has waterproof property,
the outer frame portion includes:
a rear-side outer frame portion in which the rear-side through-hole is formed; and
a front-side outer frame portion in which the front-side through-hole is formed, the front-side outer frame portion being disposed below the rear-side outer frame portion,
the opening is provided between a front edge of the rear-side outer frame portion and a rear edge of the front-side outer frame portion,
the skin seat member disposed on the front-side seating position, the skin seat member disposed on the rear-side seating position, and the elastic seat member disposed on the rear-side seating position are fixed near a front edge of the rear-side outer frame portion in the opening, and
the elastic seat member disposed on the front-side seating position is fixed near a rear edge of the front-side outer frame portion in the opening.

4. The seat structure for the saddle-ride type vehicle according to claim 2, wherein
the seat skin includes:
an elastic seat member that has elasticity; and
a skin seat member that is disposed on an upper surface of the elastic seat member and has waterproof property,
the outer frame portion includes:
a rear-side outer frame portion in which the rear-side through-hole is formed; and
a front-side outer frame portion in which the front-side through-hole is formed,
the opening is provided between a front edge of the rear-side outer frame portion and a rear edge of the front-side outer frame portion,
a lower end portion of the front edge of the rear-side outer frame portion is positioned below an upper end portion of the rear edge of the front-side outer frame portion,
the skin seat member and the elastic seat member disposed on the front-side seating position, as well as the skin seat member and the elastic seat member disposed on the rear-side seating position are fixed near a front edge of the rear-side outer frame portion in the opening.

5. The seat structure for the saddle-ride type vehicle according to claim 1, wherein
the saddle-ride type vehicle includes a foot rest portion provided in front of and below the seat,
the seat is openable and closable with a rotary shaft as a shaft fulcrum, the rotary shaft being provided at a front portion of the seat, and
the cushion member is disposed on the upper surface of the outer frame portion at least at a position in the front portion of the seat.

6. The seat structure for the saddle-ride type vehicle according to claim 5, wherein the saddle-ride type vehicle further includes a luggage box disposed below the seat.

7. The seat structure for the saddle-ride type vehicle according to claim 1, wherein the seat further includes a seat supporting portion that is disposed along an outer periphery of the outer frame portion on a lower surface side of the outer frame portion and transmits a load of the seat and a load applied to the seat to a side of the vehicle body.

8. The seat structure for the saddle-ride type vehicle according to claim 2, wherein
the saddle-ride type vehicle includes a foot rest portion provided in front of and below the seat,
the seat is openable and closable with a rotary shaft as a shaft fulcrum, the rotary shaft being provided at a front portion of the seat, and
the cushion member is disposed on the upper surface of the outer frame portion at least at a position in the front portion of the seat.

9. The seat structure for the saddle-ride type vehicle according to claim 8, wherein the saddle-ride type vehicle further includes a luggage box disposed below the seat.

10. The seat structure for the saddle-ride type vehicle according to claim 3, wherein
the saddle-ride type vehicle includes a foot rest portion provided in front of and below the seat,
the seat is openable and closable with a rotary shaft as a shaft fulcrum, the rotary shaft being provided at a front portion of the seat, and
the cushion member is disposed on the upper surface of the outer frame portion at least at a position in the front portion of the seat.

11. The seat structure for the saddle-ride type vehicle according to claim 10, wherein the saddle-ride type vehicle further includes a luggage box disposed below the seat.

12. The seat structure for the saddle-ride type vehicle according to claim 4, wherein
the saddle-ride type vehicle includes a foot rest portion provided in front of and below the seat,
the seat is openable and closable with a rotary shaft as a shaft fulcrum, the rotary shaft being provided at a front portion of the seat, and
the cushion member is disposed on the upper surface of the outer frame portion at least at a position in the front portion of the seat.

13. The seat structure for the saddle-ride type vehicle according to claim 12, wherein the saddle-ride type vehicle further includes a luggage box disposed below the seat.

14. The seat structure for the saddle-ride type vehicle according to claim 2, wherein the seat further includes a seat supporting portion that is disposed along an outer periphery of the outer frame portion on a lower surface side of the outer frame portion and transmits a load of the seat and a load applied to the seat to a side of the vehicle body.

15. The seat structure for the saddle-ride type vehicle according to claim 3, wherein the seat further includes a seat supporting portion that is disposed along an outer periphery of the outer frame portion on a lower surface side of the outer frame portion and transmits a load of the seat and a load applied to the seat to a side of the vehicle body.

16. The seat structure for the saddle-ride type vehicle according to claim 4, wherein the seat further includes a seat supporting portion that is disposed along an outer periphery of the outer frame portion on a lower surface side of the outer frame portion and transmits a load of the seat and a load applied to the seat to a side of the vehicle body.

17. The seat structure for the saddle-ride type vehicle according to claim 5, wherein the seat further includes a seat supporting portion that is disposed along an outer periphery of the outer frame portion on a lower surface side of the outer frame portion and transmits a load of the seat and a load applied to the seat to a side of the vehicle body.

18. The seat structure for the saddle-ride type vehicle according to claim 6, wherein the seat further includes a seat supporting portion that is disposed along an outer periphery of the outer frame portion on a lower surface side of the outer frame portion and transmits a load of the seat and a load applied to the seat to a side of the vehicle body.

19. The seat structure for the saddle-ride type vehicle according to claim 8, wherein the seat further includes a seat supporting portion that is disposed along an outer periphery of the outer frame portion on a lower surface side of the outer frame portion and transmits a load of the seat and a load applied to the seat to a side of the vehicle body.

20. The seat structure for the saddle-ride type vehicle according to claim 9, wherein the seat further includes a seat supporting portion that is disposed along an outer periphery of the outer frame portion on a lower surface side of the outer frame portion and transmits a load of the seat and a load applied to the seat to a side of the vehicle body.

21. The seat structure for the saddle-ride type vehicle according to claim 1, wherein each of the through-hole and opening of the outer frame portion is elongated in a vehicle width direction.

22. The seat structure for the saddle-ride type vehicle according to claim 1, wherein the cushion member is configured so as not to cover the through-hole and the opening of the outer frame portion.

* * * * *